United States Patent [19]

Meyer et al.

[11] 4,274,144

[45] Jun. 16, 1981

[54] FUEL CONTROL SYSTEM DEVELOPMENT APPARATUS

[75] Inventors: Paul M. Meyer, East Alton; Robert H. Beckwith, Elsah, both of Ill.; Richard D. Allman, Bridgeton; Mark Jefferis, Webster Groves, both of Mo.

[73] Assignee: ACF Industries, Incorporated, New York, N.Y.

[21] Appl. No.: 108,496

[22] Filed: Dec. 31, 1979

[51] Int. Cl.[3] ...................... G06F 15/20; G01M 15/00

[52] U.S. Cl. .................................. 364/551; 73/117.2; 364/424; 364/431

[58] Field of Search ....................... 364/551, 431, 424; 73/117.2, 117.3

[56] References Cited

U.S. PATENT DOCUMENTS

| | | | |
|---|---|---|---|
| 3,906,437 | 9/1975 | Brandwein et al. | 364/431 |
| 4,013,875 | 3/1977 | McGlynn | 364/424 |
| 4,116,052 | 9/1978 | Paluka | 73/117.3 |
| 4,128,005 | 12/1978 | Arnston et al. | 364/431 |
| 4,158,884 | 6/1979 | McKinley et al. | 364/431 |
| 4,205,377 | 5/1980 | Oyama et al. | 364/431 |
| 4,212,064 | 7/1980 | Forsythe et al. | 364/424 |

*Primary Examiner*—Errol A. Krass

*Attorney, Agent, or Firm*—J. Joseph Muller

[57] ABSTRACT

Apparatus for use in developing and testing a control system for an internal combustion automobile engine. A housing is located in the automobile where it can be visually observed by an operator of the automobile. Electrical circuitry is installed in the housing. A wiring harness interconnects sensors and electromechanical devices with the circuitry. A programmable memory has a plurality of addresses which are selectably accessible, different addresses in the memory containing information relating to different aspects of the system. Information stored in a selected memory address is changeable thereby changing the operating characteristics of the system. The contents stored in a selected address are visually displayed so an operator can visually verify the information stored therein. Operation of the system while the engine is running is visually monitored to determine system performance during road tests, performance of the system thus being observable under actual driving conditions.

16 Claims, 8 Drawing Figures

FUEL CONTROL SYSTEM DEVELOPMENT APPARATUS

BACKGROUND OF THE INVENTION

This invention relates to fuel management systems for internal combustion automobile engines and, more particularly, to apparatus for developing and testing such a system.

Due to present federal rules and regulations, as well as various economic and market factors, much work is being done in the automobile industry to develop fuel management systems which will be implemented on future automobile engines. Each system, to be successful, must incorporate features by which the system will produce good results in three areas: fuel economy, engine exhaust emissions, and driveability.

Regardless of the system design, the final verification of its workability is achieved by installing the system on a vehicle and observing how it performs under actual driving conditions. Thus, it may be found that certain portions of system operation need to be changed to achieve acceptable vehicle performance.

Because research and development programs of the type involved in obtaining a workable system are expensive in terms of manpower, capital equipment, and facilities, steps must be taken to maximize the results attained for money expended. Thus, for example, a test program which limits the engineer to making changes in the system only in the laboratory is cost ineffective because each needed change observed during road tests can be implemented only in the lab with a follow-up test run then being needed to determine if the system changes made improve performance. What is needed is an engineering test tool which allows program personnel to make changes during road tests with differences in system performance then being readily observable. This would reduce engineering man hours and facilitate the completion of an acceptable system.

SUMMARY OF THE INVENTION

Among the several objects of the present invention may be noted apparatus for developing and testing a control system for an internal combustion automobile engine; the provision of such apparatus for monitoring system performance during road tests of an automobile; the provision of such apparatus for making changes in the system during road tests thus to readily determine the effects of such changes to system performance; the provision of such apparatus by which such changes are easily made and readily verifiable; the provision of the such apparatus which is portable and thus may be used in the laboratory as well as during road tests; and the provision of such apparatus which is useful with auxiliary monitoring equipment such as recorders to make permanent records of system performance.

Briefly, apparatus of the present invention is for use in developing and testing a control system for an internal combustion automobile engine. The system utilizes electromechanical devices attached to a carburetor mounted on the engine, sensors for sensing various engine operating parameters and electrical circuitry including a programmable memory having a plurality of addresses for controlling operation of the devices in response to inputs from the sensors. The apparatus comprises a housing locatable about the automobile in a location where it can be visually observed by an operator of the automobile. The electrical circuitry is installed in the housing. A wiring harness interconnects the sensors and the electromechanical devices with the electrical circuitry. Means are provided for selectably accessing an address in the memory, different addresses in the memory containing information relating to different aspects of the system. Means are provided for changing the information stored in a selected memory address and thereby the operating characteristics of the system. The contents stored in a selected address are visually displayed so an operator of the system can visually verify the information stored therein. Operation of the system while the engine is running visually monitored thereby to determine system performance during road tests, performance of the system thus being observable under actual driving conditions. Other objects and features will be in part apparent and in part pointed out hereinafter.

BRIEF DESCRIPTION OF THE DRAWINGS

Corresponding reference characters indicate corresponding parts throughout the several views of the drawings.

DESCRIPTION OF A PREFERRED EMBODIMENT

Figure 1:
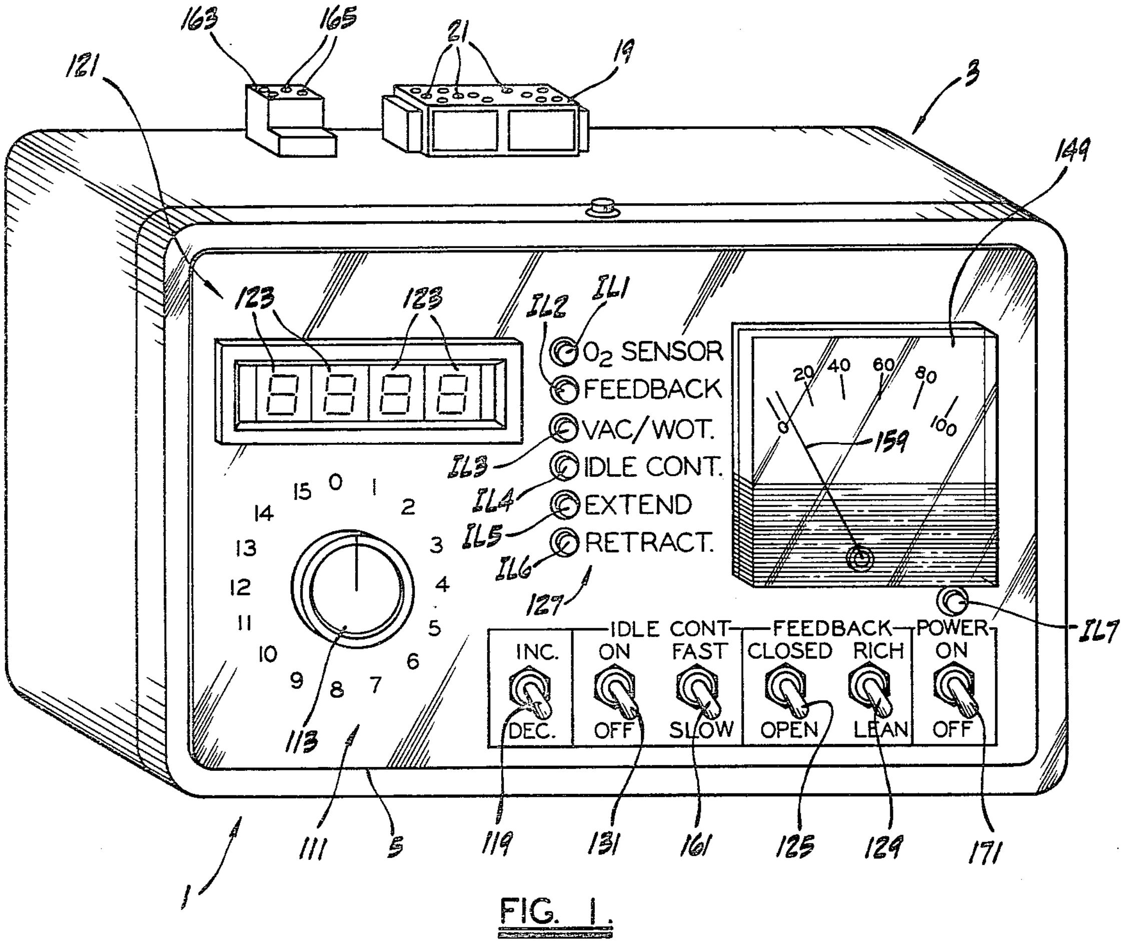
FIG. 1 is a perspective view of apparatus of the present invention.
Figure 3:
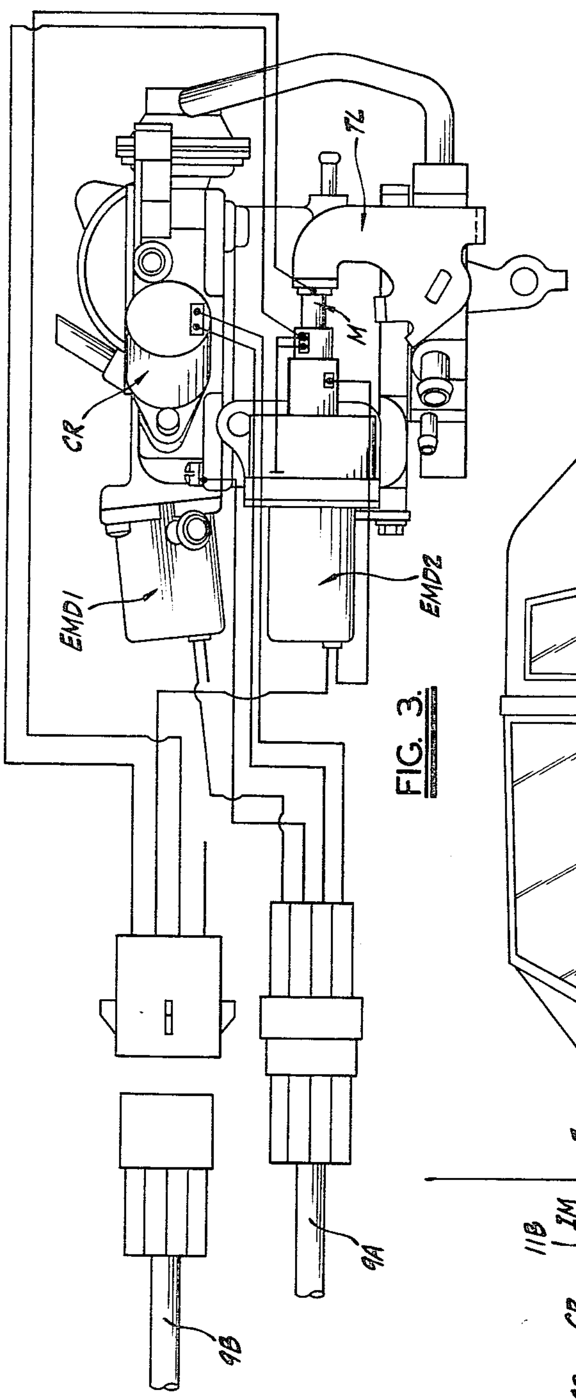
FIG. 3 is a side elevational view of a carburetor with which the system is used, electromechanical devices installed on the carburetor also being shown.
Figure 2:
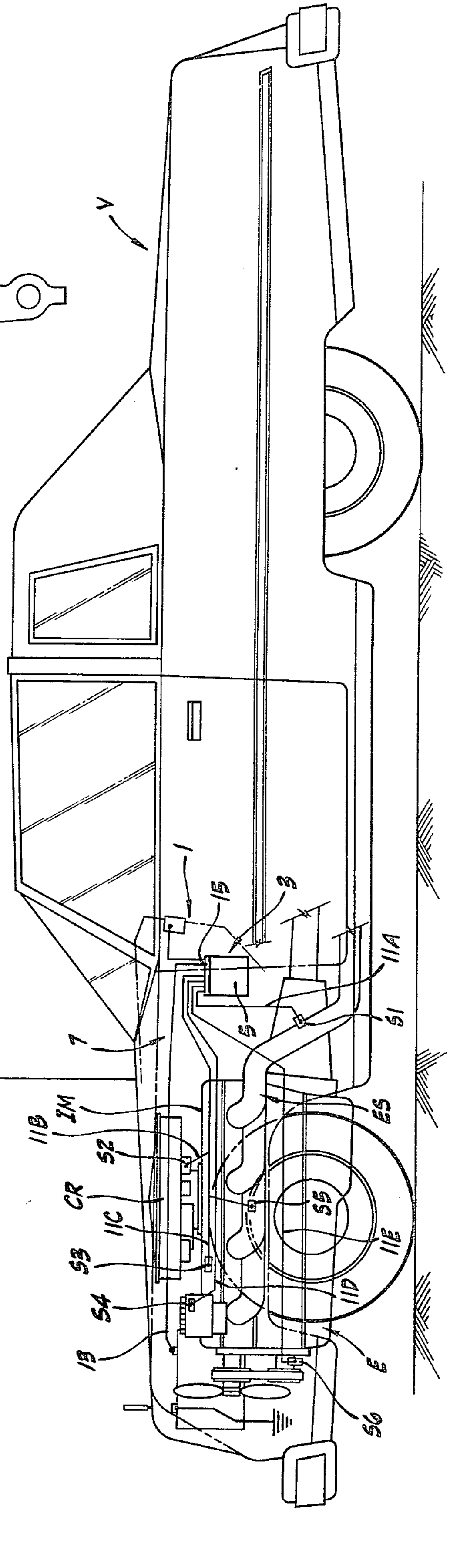
FIG. 2 illustrates the installation of the apparatus in an automobile and its interconnection with a fuel management system.

Referring to the drawings, apparatus of the present invention is indicated generally 1 in FIG. 1 and is for use in developing a control system for an internal combustion automobile engine. As shown in FIG. 2, an automobile V has an internal combustion engine E on which is mounted a carburetor CR. Referring to FIG. 3, carburetor CR has attached thereto two electromechanical devices designated EMD1 and EMD2 respectively. Device EMD1 is a feedback control device such as a solenoid or stepper motor whose function is to adjust the air-fuel ratio of the mixture produced in carburetor CR and supplied engine E; this being done in accordance with a control strategy developed for the system. Device EMD2, which is a d.c. motor, a solenoid or a stepper motor, has as its function the controlling of engine idle speed and for this purpose has an extensible and retractable control member M which acts against a throttle lever TL of carburetor CR.

The system further includes sensors for sensing various engine operating parameters. A sensor S1, for example, senses the oxygen content in an exhaust system ES of the engine. A second sensor S2, for example, senses when the throttle valve of carburetor CR is open or closed. A third sensor S3, for example, senses the vacuum level in an intake manifold IM of engine E. A fourth sensor S4 senses the spark generated by the engine distributor ED. It will be understood that other sensors may be used in the control system.

The system also includes electrical circuitry for routing and processing the electrical signals developed by the sensors. Further, control signals to control the operation of electromechanical devices EMD1 and EMD2 are gererated and routed to these devices via the circuitry. The circuitry includes a programmable memory having a plurality of addresses. The memory is used to implement a control strategy developed for the system and thus controls the operation of devices EMD1 and EMD2 in response to electrical signal inputs from the various sensors.

Apparatus 1 comprises a housing 3 locatable about automobile V in a location where it can be visually observed by an operator of the vehicle. As shown in FIG. 2, housing 3 is located in the passenger compartment of the vehicle and is positioned so a front panel 5 of the housing is observable by the operator of the vehicle. For this purpose, the housing is placed on the floor or center console of the vehicle. It will be understood, however, that the housing could be mounted atop the dashboard or even on the hood of the automobile. In any event, housing 3 is portable and may thus be transferred from the automobile to a laboratory so apparatus 1 can be used in bench tests of the system. Further, the electrical circuitry portion of the system previously described is installed in housing 1.

A wiring harness 7 interconnects the sensors and the electromechanical devices with the electrical circuitry. Wiring harness 7 is made up of a number of wire bundles. Wire bundles 9A and 9B, for example, route signals from the circuitry to and from respective electromechanical devices EMD1 and EMD2. Similarly, wire bundles 11A, 11B, 11C, and 11D route signals from sensors S1, S2, S3 and S4 respectively to the electrical circuitry. In every instance, suitable electrical connectors mate the appropriate end of each wire bundle with the respective electromechanical devices and sensors. In addition, a wire bundle 13 routes d.c. battery voltage from the automobile battery to the apparatus. A connector 15 located at one end of wire bundle 7 is connectable to a suitable mating connector 19 (see FIG. 1) located atop housing 3. Connector 19 has a plurality of pin receptacles 21, the number of receptacles 21 shown in FIG. 1 being shown only for sake of drawing clarity.

Figure 4:
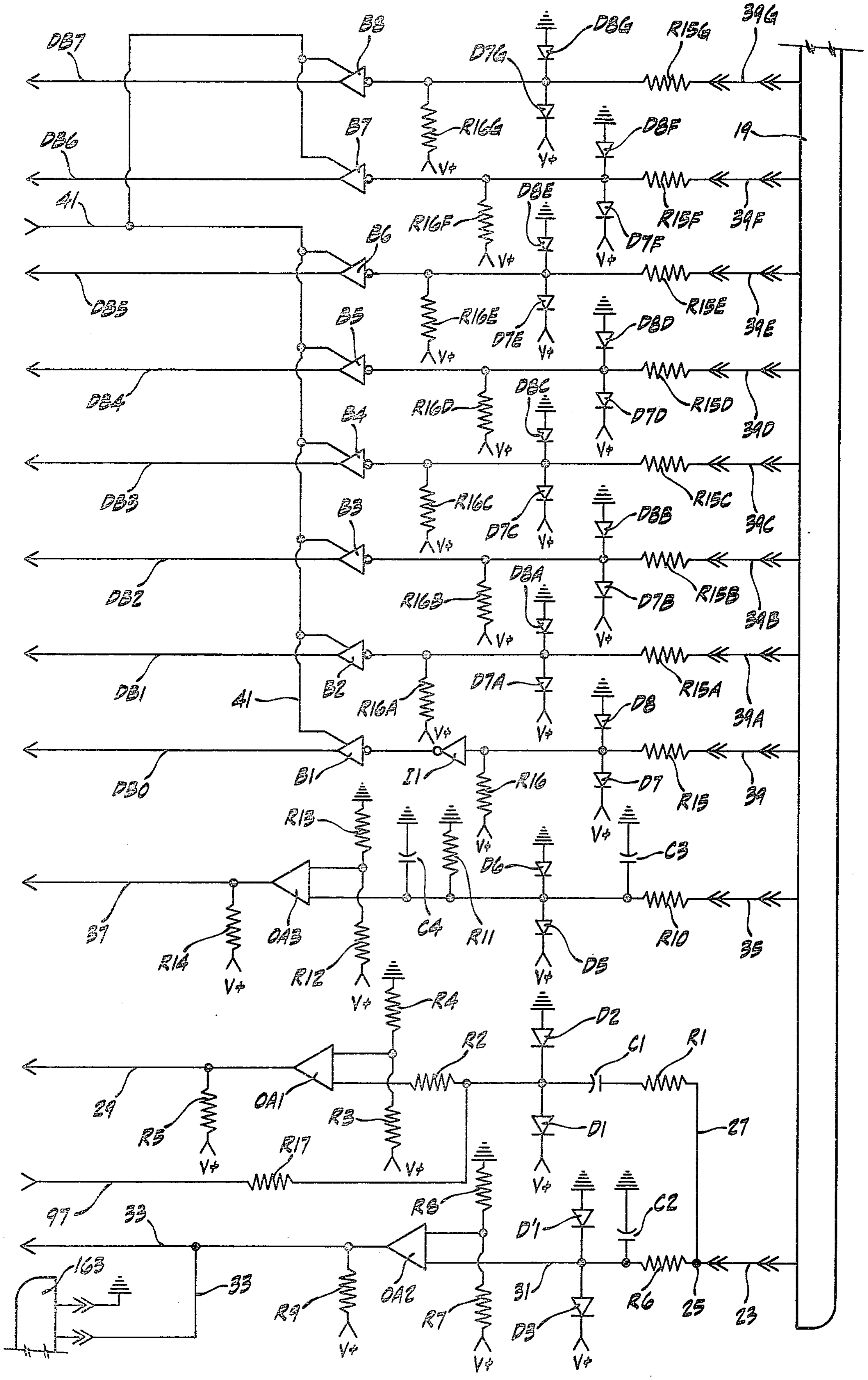
FIGS. 4–8 are schematic circuit diagrams of electrical circuitry of the apparatus.

Referring to FIG. 4, the electrical signal developed by oxygen sensor S1 is supplied on a line 23 from connector 19 to a junction 25. From the junction, the signal is routed via a first circuit path 27 to a short circuit protection resistor R1 and a decoupling capacitor C1. A pair of diodes D1 and D2 limit the input level of the signal applied to one input of an operational amplifier (op. amp.) OA1 via a resistor R2. Op. amp. OA1 functions as a comparator and a pair of resistors R3 and R4 form a voltage divider to develop a reference level applied to the other input of the op. amp. Op. amp. OA1 is of the open collector type and a pull-up resister R5 is connected in parallel with the output of the op. amp. to develop its output signal. This signal is supplied on a line 29. When the engine is first started, sensor S1 is cold and the logic output of op. amp. OA1 is high. At this time, the information represented by the signal from the sensor is not processed. When the sensor has heated up to a temperature at which the sensor signal is to be processed, the logic output of op. amp. OA1 goes low.

The sensor S1 output signal is applied to a second circuit path 31 which includes a filter comprised of a resistor R6 and a capacitor C2 as well as limiting diodes D3 and D4. The signal is applied to one input of an op. amp. OA2, which also functions as a comparator, and which is supplied a reference level at its other input via a voltage divider constituted by a pair of resistors R7 and R8. Op. amp. OA2 is also of the open collector type and a resistor R9 is connected in parallel with the output of the comparator to develop a signal applied on a line 33. The signal supplied on line 33 represents the oxygen content of the engine products of combustion.

The spark signal from sensor S4 is applied on a line 35 from connector 19 and a resistor R10 and a capacitor C3 connected in paralled form a first filter for the signal. A pair of diodes, D5 and D6, function as signal limiters as previously described. A second filter comprised of a parallel connected resistor R11 and a capacitor C4 further filters the signal from sensor S4. By filtering the sensor S4 signal twice, any ringing is eliminated. The sensor signal is applied as one input to an op. amp. OA3 which functions as a comparator. A second input to the comparator is a reference level developed across a voltage divider comprised of resistors R12 and R13. As before, op, amp. AO3 is an open collector type and a resistor R14 connected in parallel with the output of the op. amp. serves to develop a signal supplied by the op. amp. on a line 37.

The signal from the throttle position sensor S2 is supplied on a line 39 from connector 19 via a resistor R15 to the input of an inverter I1. Connector in parallel with line 39 or a pair of limiting diodes D7 and D8 and a pull-up resistor R16. The output of the inverter is supplied to the inverting input of a tri-state buffer B1. Buffer B1 is a unity gain amplifier whose output is inhibited unless a strobe signal is applied to it on a line 41. The output signal of the buffer is applied to a data bus line DB0.

Other sensor input signals are routed to respective buffers B2 to B8 on lines 39A through 39G. Each circuit path includes a resistor, R15A through R15G respectively. A pair of limiting diodes, D7A through D7G, and, D8A through D8G, as well as a pull-up resistor, R16A through R16G, are connected in parallel to each circuit path. The signal output of buffers B2 to B8 are supplied to respective data bus lines DB1 through DB7.

Figure 5:
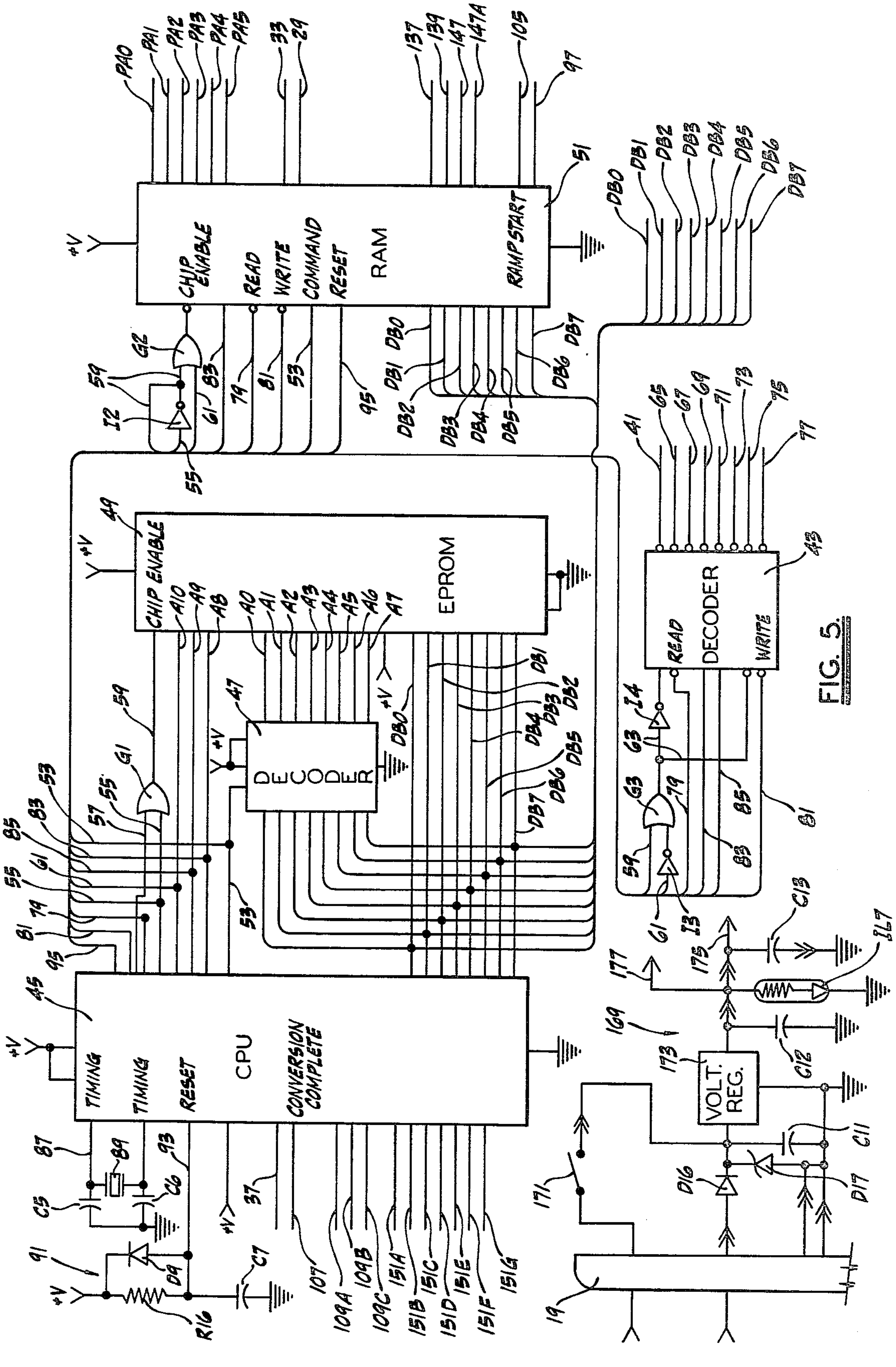

Referring to FIG. 5, the strobe signal supplied on line 41 to buffers B1 through B8 is generated by a decoder 43 whose operation is controlled by a central processing unit (CPU) 45. When the buffers are strobed, the signal outputs from the buffers are supplied in parallel as an 8-bit data word input to CPU 45. As further shown in FIG. 5, data bus lines DB0 through DB7 are also routed to a decoder 47, an erasable programmable read-only memory chip (EPROM) 49, and a random access memory chip (RAM) 51. The data bus represented by lines DB0–DB7 is a bi-directional bus. Thus, for example, the bus lines by which information is transferred from buffers B1 through B8 may also be used to transfer information from CPU 45 to RAM 51 or a memory address from the CPU to decoder 47.

Decoder 47 is used to address memory locations in EPROM 49 and transfer the information to CPU 45 over the eight data bus lines DB0–DB7. Decoder 47 has eight output lines A0 through A7 by which eight bits of an address are transmitted to EPROM 49. EPROM 49, however, requires an 11-bit message in order to access a memory address. Three additional address lines A8 through A10 are therefore routed to the EPROM directly from CPU 45. Decoder 47 does not transfer the eight-bit address bit supplied to it by CPU 45 to EPROM 49 until the CPU supplies a command signal to the decoder. This signal is supplied to the decoder over a line 53, which line is also routed to RAM 51.

EPROM 49 does not access the memory location indicated by the contents of the 11-bit address word nor transfer the information stored thereat until it receives a chip enable command signal from CPU 45. Two signals are supplied from CPU 45, on lines 55 and 57 respectively, as inputs to an OR gate G1. The output of gate G1 is supplied on a line 59 to the chip enable input of EPROM 49. When the logic levels of the inputs to gate G1 are both low, the logic output of the gate is low and this enables EPROM 49.

Both RAM 51 and decoder 43 require enable signals in order to perform functions commanded by CPU 45. For this purpose, line 55 is also routed to the input of an inverter I2. The output of the inverter is supplied on a line 59 as one input to an OR gate G2 and OR gate 63. In addition, the signal supplied to EPROM 49 on line A10 is also routed via a line 61 to a second input of gate G2 and to the input of an inverter I3. The output of inverter I3 is connected to a second input of gate G3. The logic output of gate G2 is applied to the chip enable input of RAM 51, the logic level of the gate G2 output being inverted at the chip enable input. The logic output of gate G3 is applied on a line 63 to the input of an inverter I4 and to one input of decoder 43. This logic level is inverted at the input to the decoder. The logic putput of inverter I4 is applied to a second input of this decoder. The operation of the gates and inverters just described causes either RAM 51 or decoder 43 to be enabled to perform a function commanded by CPU 45 when the logic level of the input or inputs to the respective devices are a certain combination. The gates and inverters thus function to decode signals from the CPU and initiate a commanded operation when the decoded information conforms to a predetermined pattern.

Decoder 43 has four output control lines R1, 65, 67, and 69 for bringing information into CPU 45 and four output control lines 71, 73, 75, and 77 for commanding the output of information. The former control lines are referred to as "read" or "read strobe" lines while the latter are referred to as "write" or "write strobe" lines. The same is true with respect to RAM 51 which can either receive data if it is commanded to read or generate an output if it is commanded to write. A read command is supplied to decoder 45 and RAM 51 by CPU 45 via a line 79 and a write command is supplied to the decoder and RAM via a line 81. Both the read and write signals to each device are inverted at the respective read and write inputs of each device.

Because decoder 43 has four read lines and four write lines, the particular read or write line over which the appropriate strobe or command signal is sent must be determined. For this purpose, the signals routed from CPU 45 to RAM 51 over lines A8 and A9 and routed to decoder 43 via lines 83 and 85 respectively. When decoder 43 is enabled, it decodes the information transmitted to it over lines 83 and 85 to determine which read or write line a strobe command is to be sent over.

CPU 45 has an associated timing circuit 87 which generates timing pulses to control the operation of the system. Circuit 87 comprises a crystal oscillator 89 connected in parallel between a pair of capacitors, C5 and C6 respectively. The capacitors, in turn, are connected in parallel. The CPU also has an associated reset circuit 91 by which CPU 45 is reset on initial power-up of the system. Circuit 91 comprises a resistor R16 connected in series with a capacitor C7. One side of capacitor C7 is grounded and a diode D9 is connected across the resistor. A line 93 connects the reset input of CPU 45 to the junction between the resistor and capacitor. Upon power-up of the system, a logic high is applied to the reset input of CPU 45 for a period determined by the time constant of resistor R16 and capacitor C7. RAM 51 may also be reset at this time and a reset signal is applied to the reset input of the RAM via a line 95 from CPU 45.

Referring to FIGS. 4 and 5, RAM 51, receives as an input signal, the output of op amp OA1 on line 29. This signal is supplied to the RAM when a transfer signal is applied to a line 97 from the RAM. Line 97 includes a resistor R17. As previously discussed, the logic output of op amp OA1 indicates if oxygen sensor S1 has reached its operating temperature. If the operating temperature of the sensor has been reached, then the output of op amp OA2, representing the oxygen content of engine exhaust is supplied as an input to RAM 51 on line 33. The output signal from op amp OA3 (this signal representing the sensed ignition spark generation) is supplied as an input to CPU 45 via line 37.

Figure 7:
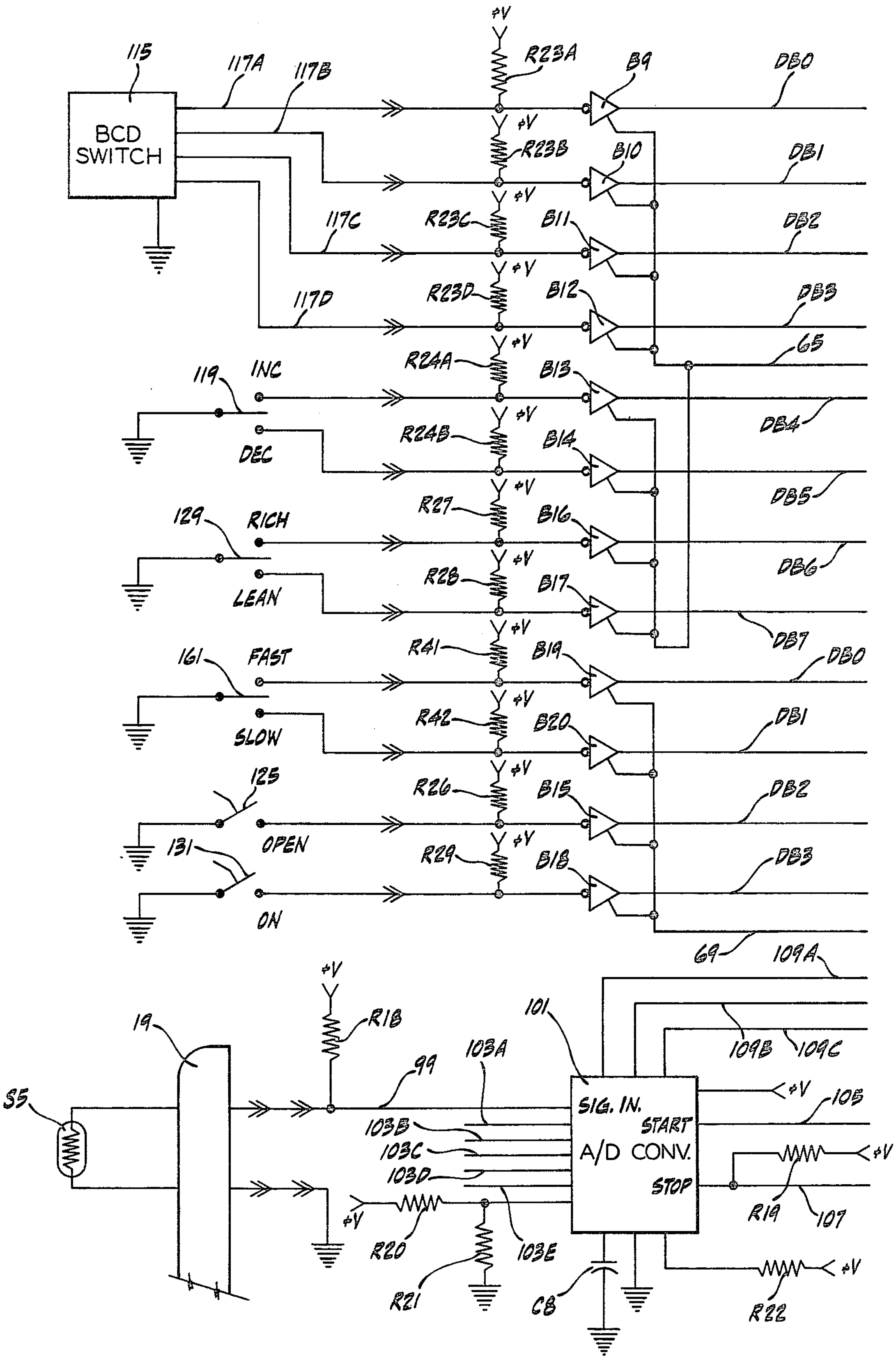

Referring to FIGS. 1, 5 and 7, a sensor S5, for example, senses the water temperature of the engine. The signal produced by the sensor is supplied via wiring harness 17, connector 19 and a line 99 as an input to an analog-to-digital converter 101. A pull-up resistor R18 is an analog signal and as such must be converted to its digital equivalent. Line 99 represents but one of a series of analog input lines to converter 101, with other analog input signals being supplied to the converter via lines 103A through 103E. Converter 101 performs an analog to digital conversion when a ramp start signal is received from RAM 51 on a line 105. When a conversion is completed, a signal is supplied to CPU 45 via a line 107. A pull-up resistor R19 is connected parallel with the output of converter 101. A voltage divider comprised of resistors R20 and R21 produces a reference voltage for the converter. A resistor R22 produces a current reference for the converter and a capacitor C8 acts as a ramp capacitor. Because converter 101 may receive more than one analog input signal, CPU 45 supplies three address bits on lines 109A, 109B, and 109C to the converter to determine which input signal is converted at any one time.

RAM 51 is designed to function both as a memory unit and as an input/output unit. Which function it performs at any one time is determined by the logic level of a signal supplied to the RAM from CPU 45 on line 83. When RAM 51 functions as a memory unit, information stored in its addresses is used to control operation of the system. By changing the contents of the information stored at the various addresses within RAM 51, the response of the system is effected. Thus, for example, the richness or leanness of the mixture supplied to the engine for certain engine operating conditions may be changed by altering the contents of the information stored at particular address.

Apparatus 1 comprises means 111 for selectably accessing an address in the memory, i.e. an address in RAM 51. As noted, different addresses in the memory of RAM 51 relate to different aspects of the system. Means 111 includes a multiple position switch 113 and, as shown in FIG. 1, switch 113 is settable to one of sixteen different positions. A binary coded decimal (BCD) switch 115 (see FIG. 7) is controlled by switch 113 and switch 115 generates an output signal on lines 117A through 117D which is the binary equivalent of the number representing the position to which switch 113 is set. Operation of a binary coded decimal switch 115 is well known in the art. A pull-up resistor R23A through R23D is connected in parallel with respective output lines 119A through 117D and each respective line is connected to the input of a respective buffer B9 through B12. Each buffer is strobed by a signal from decoder 43 on read line 65 and the outputs from the buffers are supplied to RAM 51 on lines BD0–DB3 respectively.

Means 111 further comprises a switch 119 for incrementing and decrementing the contents in a selected memory address. Switch 119 is a momentary switch and, as shown in FIG. 7, movement of the switch to either the increment or decrement position grounds the input of a respective buffer B13 or B14. A resistor R24A is connected in parallel with the input of buffer B13 as is a resistor R24B with the input of buffer B14. Each buffer is strobed by a read signal on line 65 and the output of buffer B13 is supplied to RAM 51 on line DB4 while the output of buffer B14 is supplied to the RAM on line DB5.

Operation of means 111 is such that by positioning switch 113 to one of the sixteen positions, a particular address in RAM 51 is accessed. Once this is done, the binary contents of the information stored at that address is incremented or decremented by appropriately positioning switch 119.

Figure 6:
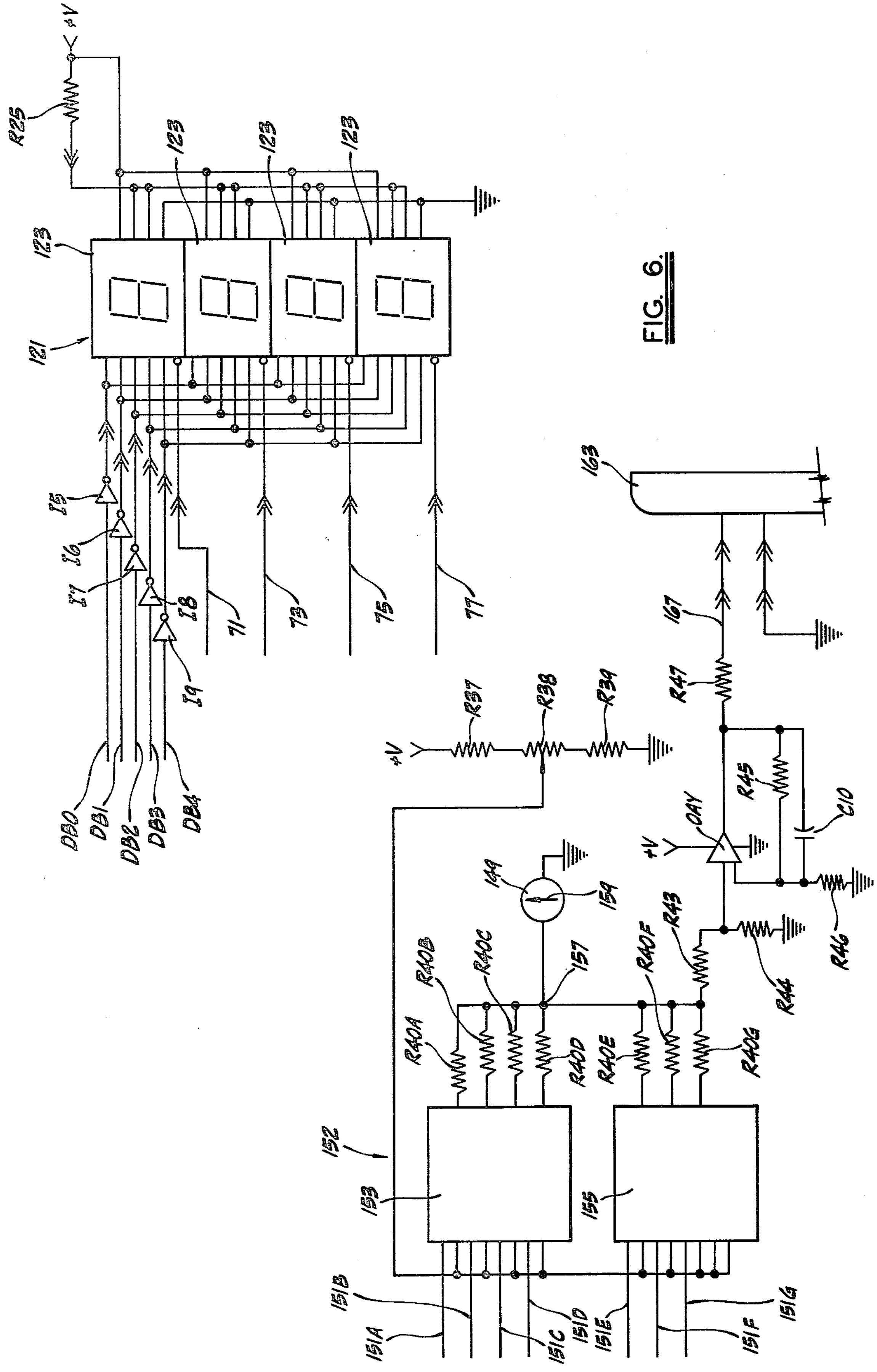

Apparatus 1 has means generally designated 121 for visually displaying the contents stored in a selected memory address. This permits the operator of the system to visually verify the contents of the information stored at that address. As shown in FIGS. 1 and 6, means 121 includes at least four light-emitting diodes (LEDs) 123 capable of displaying hexadecimal alphanumeric characters (i.e. the numerals 0, 1, 2, 3, 4, 5, 6, 7, 8, 9, and the letters A, B, C, D, E, and F). The inputs to each LED are supplied on lines BD0–DB4 via inverters I5–I9 respectively. Control of each LED is via a write signal supplied from decoder 43 on respective control lines 71, 73, 75, and 77. A resistor R25 is connected between positive voltage +V and electrical ground and in parallel with two outputs of each LED. This circuit generates the display current for each LED. Thus, the operator of apparatus 1 can read the contents of the information in any selected memory address and verify the new contents stored in that address after the original contents are incremented or decremented.

As previously described, the system provides feedback control of the electromechanical devices based upon the sensed engine operating parameters. At times, however, it is desirable to operate in an open loop configuration, i.e. without feedback. One such condition, for example, occurs when the engine is just started and before the oxygen sensor has heated up to its operating temperature. Another condition, for example, is when the engine is operated at carburetor wide-open throttle (WOT). To test operation of the system, apparatus 1 contains a switch 125 (see FIGS. 1 and 7) which when closed signifies the system is to operate open-loop. Switch 125, when closed, grounds the inverting input of a buffer B15. A resistor R26 is connected in parallel to the input of the inverter which is strobed by a read signal on line 69. The output of buffer B15 is supplied to CPU 45 on lone DB2. When the CPU receives the command to operate the system open-loop, the electromechanical devices are moved to a predetermined position at which they exercise no control over engine operation.

Figure 8:
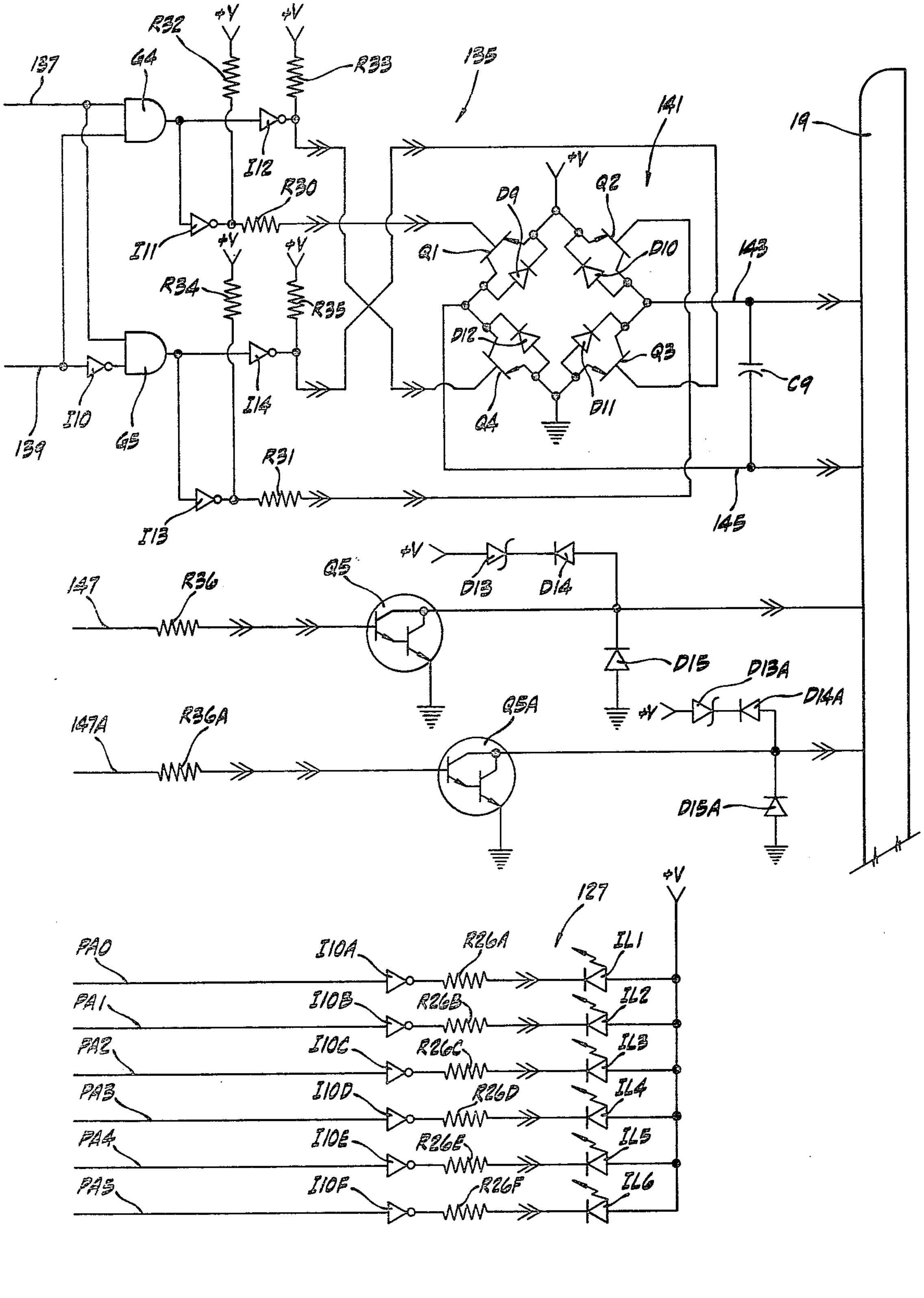

Apparatus 1 further comprises means generally indicated 127 (see FIGS. 1 and 8) for visually monitoring operation of the system while the engine is running, thus to aid an operator of the system to determine system performance during road tests. Means 127 comprises a plurality of indicator lamps IL1 through IL6, the indicator lamps each being an LED. An illumination signal is provided to each indicator lamp from RAM 51 via respective signal lines PA0 through PA5 (see FIGS. 5 and 8). Each signal line from the RAM to its associated indicator lamp includes a series connected inverter I10A through I10F respectively) and resistor (R26A through R26F respectively). When switch 125 is closed, for example, to command open-loop rather than feedback operation of the system, indicator lamp IL2 is turned on via a signal from RAM 51 on line PA1.

Apparatus 1 next includes a switch 129 (see FIGS. 1 and 7) for biasing the air-fuel ratio of the mixture supplied the engine to either rich or lean. Switch 129 is a momentary switch with one contact (RICH) connected to the inverting input of a buffer B16 and with its other contact (LEAN) connected to the inverting input of a buffer B17. A resistor R27 is connected in parallel with the input of buffer B16 and a resistor R28 is connected in parallel with the input of buffer B17. Both buffers are strobed by a read signal on line 65 and outputs of the buffers are supplied to CIP 45 on lines DB6 and DB7 respectively. When commanded rich or lean, CPU 45 generates a signal to drive electromechanical device EMD1 to adjust the air-fuel mixture to have more air per given quantity of fuel than would otherwise happen (a lean condition) or less air per given quantity of fuel (a rich condition).

Electromechanical device EMD2 controls engine idle speed. An on-off switch 131 (see FIGS. 1 and 7) is used to command the system to engage or disengage idle speed control operation. Switch 131, when closed, grounds the inverting input of a buffer B18. A resistor R29 is connected in parallel with the buffer input. The buffer is strobed by a read signal on line 69 from decoder 43 and the buffer output is supplied to CPU 45 on line DB3. When switch 131 is closed, indicator lamp IL4 is illuminated to indicate the system is performing idle speed control.

As previously mentioned, electromechanical device EMD2 has an extensible and retractable member M which bears against a throttle lever TL of carburetor CR to adjust the position of the carburetor throttle. Electromechanical device EMD2 receives electrical control signals from a driver 135 (see FIG. 8) which, in turn, is controlled by signals from RAM 51. Driver 135 comprises a first AND gate G4 and second AND gate G5. RAM 51 provides a signal to one input of gate G4 over a line 137 and a signal to input of gate G5 over a line 139. The signal supplied over line 139 is supplied to gate G5 through an inverter I10. Both signals on both input lines are also supplied as second inputs to the respective gates G4 and G5. The logic gates function as decoders to determine both when electromechanical device EMD2 is driven and whether member M of the device is to be extended or retracted. The logic output of each gate is supplied to a transistor bridge 141 comprised of transistors Q1, Q2, Q3, and Q4. These transistors are PNP transistors and have associated protection diodes, D9 through D12 respectively, connected across their emitter-collector terminals.

The logic output of gate G4 is applied to the base of transistor Q1 through an inverter I11 and a resistor R30 and to the base of transistor Q4 through an inverter I12. The logic output of gate G5 is applied to the base of transistor Q2 through an inverter I13 and a resistor R31 and to the base of transistor Q3 through an inverter I14. All four inverters I11–I14 are of the open-collector type and have associated pull-up resistors R32–R35 respectively. The output of bridge 141 to electromechanical device EMD2 is supplied to the connector on lines 143 and 145 via wire bundle 9B. If line 143 is high with respect to line 145 (which occurs when transistors Q2 and Q4 are on and transistors Q1 and Q3 are off) member M is extended. When line 145 is high with respect to line 143 (transistors Q1 and Q3 on, Q2 and Q4 off), member M is retracted. A filter capacitor C9 is connected between lines 143 and 145. Indicator lamp IL5 is illuminated when member M is extended and indicator lamp IL6 is illuminated when the member is retracted.

Electromechanical device EMD1 is controlled by a signal supplied by RAM 51 on a line 147. This signal is supplied to a Darlington-type transistor Q5 through a resistor R36. Transistor Q5 functions as a power amplifier. When a signal to electromechanical device EMD1 terminates, a voltage spike is generated by the coil of the device. To protect the circuitry of the system, a zener diode D13 and a second diode D14 are series connected between a voltage source and the output of transistor Q5. Also, a diode D15 is connected between the transistor output and electrical ground. Diodes D13, D14, and D15 serve to clamp the voltage spike to, for example, 40 volts. Further, they decrease collapse time of the coil field so electromechanical device EMD1 can be operated a fast rate. An identical circuit incorporating a Darlington transistor Q5A, a resistor R36A and diodes D15A is used, for example to control venting of carburetor CR to a charcoal canister (not shown). A signal supplied on a line 147A from RAM 51 controls operation of this second circuit.

Visual display means 127 besides providing the visual displays already discussed also provides two other visual indications. Indicator lamp IL1 is illuminated when the temperature of oxygen sensor S1 is at its predetermined operating temperature. Also, indicator lamp IL3 is illuminated whenever engine E is operated at carburetor CR wide open throttle.

The signal supplied to electromechanical device EMD1 or EMD2 may have a variable duty cycle. Apparatus 1 includes a means 149 for providing a visual indication of the duty cycle of the signal at any one time. Means 149 is an analog type meter mounted on the front panel of housing 3. To provide a visual indication of duty cycle, CPU 45 supplies a digital output signal on lines 151A through 151G to a digital to analog (D/A) converter 152 including two analog switch units 153 and 155 (see FIG. 6). Lines 151A through 151D are connected to inputs of switch unit 153 while lines 151E, 151F, and 151G are connected to inputs of switch unit 155. A reference voltage network comprised of resistors R37, R38, and R39 develops a reference which is also supplied as in input to the switch units. The output of the converters is supplied through a network of summing resistors R40A through R40G to a summing point 157. At this point, a summing current is developed whose magnitude represents the value of the digital output signal from CPU 45 and hence duty cycle. This current drives an indicator 159 of meter 149 to provide the visual indication of duty cycle.

Electromechanical device EMD2 can be driven at a fast or slow rate and apparatus 1 further includes a switch 161 (see FIGS. 1 and 7) for adjusting the rate at which member M of the device extends or retracts. When switch 161 is moved to its "FAST" position, the inverting input of a buffer B19 is grounded. When the switch is moved to "SLOW", the inverting input of a buffer B20 is grounded. A resistor R41 and a resistor R42 are respectively connected in parallel with the inputs of buffers B19 and B20. Each buffer is strobed by a read signal on line 69, and buffer B19 supplies its output to CPU 45 on line DB0 while buffer B20 supplies its output to the CPU on line DB1.

Apparatus 1 of the present invention may be used for bench tests of the system as well as road tests. For this purpose, housing 3 is portable and is designed to be readily installed and removed from an automobile V. When used for bench tests, ancillary equipment may be used in conjunction with the apparatus. A strip chart recorder, for example, is connected to the apparatus via a connector 163 located on the top of housing 3. Connector 163 is a multipin connector and has a plurality of pin receptacles 165, only four of which are indicated in FIG. 1 for sake of drawing clarity.

Among the signals which are supplied to the ancillary test equipment are the oxygen sensor S1 output signal which is routed to connector 165 on line 33 (see FIG. 4). Referring to FIG. 6, the current signal produced at summing point 157 is supplied, via a divider network comprised of resistors R43 and R44 to the input of an operational amplifier OA4 functioning as an integrator. The feedback circuit of the amplifier includes a resistor R45 and a capacitor C10 connected in parallel to each other and to a resistor R46. The signal output of the amplifier is routed via a line 167 and a resistor R47 to connector 163.

Apparatus 1, when installed in an automobile V is powered by the vehicle power supply. Apparatus 1 includes a means 169 for accomplishing this function. Means 169 comprises an on-off switch 171 (see FIGS. 1 and 5) mounted on the front panel of housing 3. When switch 171 is closed, battery voltage routed to connector 19 via wiring harness 7 is applied to a voltage regulator 173 via a diode D16. A power protection zener diode D17 is connected in parallel with the input to the voltage regulator as is a filter capacitor C11. The output of the voltage regulator is, for example, 5 volts d.c. and is distributed throughout the apparatus via a power bus 175 and a power bus 177. Capacitors C12 and C13 filter the voltage output of the regulator and an indicator lamp IL7, which is also an LED, provides a visual indication of when power is on.

In view of the above, it will be seen that the several objects of the invention are achieved and other advantageous results obtained.

As various changes could be made in the above constructions without departing from the scope of the invention, it is intended that all matter contained in the above description and shown in the accompanying drawing shall be interpreted as illustrative and not in a limiting sense.

What is claimed is:

1. Apparatus for use in developing and testing a control system for an internal combustion automobile engine, the system utilizing electromechanical devices attached to a carburetor mounted on the engine, sensors for sensing various engine operating parameters and electrical circuitry including a programmable memory having a plurality of addresses for controlling operation of the devices in response to inputs from the sensors, the apparatus comprising:

a housing locatable about the automobile in a location where it can be visually observed by an operator of the automobile, the electrical circuitry being installed in the housing;

a wiring harness for interconnecting the sensors and the electromechanical devices with the electrical circuitry;

means for selectably accessing an address in the memory, different addresses in the memory containing information relating to different aspects of the system;

means for changing the information stored in a selected memory address and thereby the operating characteristics of the system;

means for visually displaying the contents stored in a selected address so an operator of the system can visually verify the information stored therein; and means for visually monitoring operation of the system while the engine is running thereby to determine system performance during road tests, performance of the system thus being observable under actual driving conditions.

2. Apparatus as set forth in claim 1 wherein the address accessing means comprises a multiple position switch the setting of which determines the address in the memory accessed.

3. Apparatus as set forth in claim 2 wherein the information changing means comprises mean for incrementing and decrementing the contents in a selected memory address.

4. Apparatus as set forth in claim 3 wherein the visual display means comprises means capable of displaying at least four hexadecimal alpha-numeric characters.

5. Apparatus as set forth in claim 1 wherein the system includes a feedback loop and the apparatus includes means for selecting whether system operation is closed loop or open loop.

6. Apparatus as set forth in claim 5 wherein the visual monitoring means includes means providing a visual indication of whether the system is operating closed or open loop.

7. Apparatus as set forth in claim 1 wherein the system controls the air-fuel ratio of mixture supplied the engine and the apparatus includes means for biasing the air-fuel ratio to rich or to lean.

8. Apparatus as set forth in claim 1 wherein the system includes an idle speed control and the apparatus includes means for selectably energizing the idle speed control portion of the system.

9. Apparatus as set forth in claim 8 wherein the visual monitoring means includes means providing a visual indication of whether the idle speed control portion of the system is energized.

10. Apparatus as set forth in claim 8 wherein the idle speed control portion of the system includes an electromechanical device having an extensible and a retractable member and the apparatus includes means for adjusting the rate at which the member extends and retracts.

11. Apparatus as set forth in claim 10 wherein the visual monitoring means includes means providing a visual indication of when the member is being extended and retracted.

12. Apparatus as set forth in claim 11 wherein the visual monitoring means further includes means providing a visual indication of when the engine is operating at wide open throttle.

13. Apparatus as set forth in claim 1 wherein the system utilizes an electrical control signal having a variable duty cycle and the apparatus further includes means providing a visual indication of the duty cycle of the signal at any one time.

14. Apparatus as set forth in claim 1 further including means for supplying electrical signals indicative of system operation to ancillary monitoring equipment.

15. Apparatus as set forth in claim 1 wherein the housing is portable and removable from the vehicle thus permitting the apparatus to be used for bench tests as well as road tests.

16. Apparatus as set forth in claim 1 wherein the apparatus includes means for utilizing a vehicle power supply for powering the apparatus.

* * * * *